United States Patent [19]
Kawahara et al.
[11] 3,914,543
[45] Oct. 21, 1975

[54] IMAGE ANALYZER USING A STANDARD SCANNING OR A MULTI-INTERLACED SCANNING TYPE TELEVISION SYSTEM

[75] Inventors: Atsushi Kawahara; Koji Yamada, both of Kawasaki, Japan

[73] Assignee: Nippon Kogaku K.K., Tokyo, Japan

[22] Filed: Oct. 5, 1973

[21] Appl. No.: 403,901

[30] Foreign Application Priority Data

Oct. 9, 1972 Japan .............................. 47-100628

[52] U.S. Cl. .... 178/6.8; 178/DIG. 24; 178/DIG. 36
[51] Int. Cl.[2] .............................. H04N 7/18
[58] Field of Search ........ 178/6.8, DIG. 24, DIG. 36

[56] References Cited

UNITED STATES PATENTS

| | | | |
|---|---|---|---|
| 3,806,644 | 4/1974 | Browne | 178/6.8 |
| 3,830,971 | 8/1974 | vanderPolder | 178/6.8 |
| 3,832,487 | 8/1974 | deNiet | 178/DIG. 24 |

*Primary Examiner*—Howard W. Britton
*Attorney, Agent, or Firm*—Fitzpatrick, Cella, Harper & Scinto

[57] ABSTRACT

An image analyzer using a standard scanning or a multi-interlaced scanning type television system includes a television circuit for producing analog video signals representative of an image to be analyzed, and a converter circuit for converting the analog video signals into digital video signals. The digital video signals may be stored in and read out of shift registers provided for respective fields and corresponding in number to the number of fields. The storage and read-out of the digital video signals may be accomplished by the use of the first and second clock pulses supplied from a pulse supply circuit to the respective shift registers. The read-out outputs of the shift registers may be combined into one frame by a gate circuit, and then processed by information processing means.

6 Claims, 7 Drawing Figures

IMAGE ANALYZER USING A STANDARD SCANNING OR A MULTI-INTERLACED SCANNING TYPE TELEVISION SYSTEM

BACKGROUND OF THE INVENTION

1. Field of the Invention

This invention relates to an image analyzer using an interlaced scanning type television. (By the word "interlaced scanning type" in this specification is meant "a standard scanning type" and "a multi-interlaced scanning type televisions.")

2. Description of the Prior Art

A known image analyzer analyzes the area ratio of an object to be analyzed or the distribution of cells in such object by employing a progressive scanning type television system. The progressive scanning type television system is more expensive but poorer in performance then the standard scanning type or the multi-interlaced scanning type.

SUMMARY OF THE INVENTION

We therefore contribute by the present invention, an image analyzer by which we are able to overcome the above-noted drawbacks. Actually, we provide an image analyzer which uses a standard scanning type or a multi-interlaced scanning type television system provided with a signal converter circuit.

The image analyzer of the present invention may comprise a television circuit for converting an image to be analyzed into analog video signals, and a converter circuit for converting the analog video signals into digital video signals. Shift registers may be provided for storing and reading out the digital signals for respective fields. The shift registers correspond in number to the number of fields. A pulse supply circuit may be provided for supplying a first clock pulse for imparting a storage operation to the shift registers so that the digital signals for respective fields are successively stored in the shift registers correcponding to the respective fields, and for supplying a second clock pulse for imparting a read-out operation to the shift registers, after completion of the storage operation, so that the digital signals are successively read out of the shift registers in the order of the horizontal scanning lines as they form one frame. We contemplate the use of a gate circuit for combining all the read-out outputs of the shift registers into one frame, the output from the gate circuit being processed by information processing means.

The television circuit provides a synchronizing signal for synchronizing the pulse supply circuit and the processing means, and the converter circuit compares the voltages representing the analog video signals with a suitable reference voltage and converts the former voltages into digital video signals.

In another embodiment, the image analyzer of the present invention may utilize dynamic shift registers to store and read out the digital signals for respective fields. Again, these dynamic shift registers correspond in number to the number of fields. A delay circuit is preferably associated with each of the dynamic shift registers other than that for the last field in one frame so that the content of each dynamic shift register is restored upon storage operation of the dynamic shift register corresponding to the subsequent field. A pulse circuit supplys a first clock pulse for imparting a storage operation to the dynamic shift registers so that the digital signals for respective fields are stored in the dynamic shift registers corresponding to the respective fields, and for supplying a second clock pulse for imparting a read-out operation to the dynamic shift registers, after completion of the storage operation, so that the digital signals are successively read out of the dynamic shift registers in the order of the horizontal scanning lines as they form one frame. A first gate circuit may be connected to the converter circuit, to each of the dynamic shift registers, and to each of the delay circuits so as to distribute the digital video signals for respective fields and to deliver the distributed digital video signals to the dynamic shift registers corresponding to the fields and, when one of the dynamic shift registers is in storage operation, to re-deliver the digital video signals of the other dynamic shift register which has completed its storage operation to the said other dynamic shift register for storage therein. A second gate circuit may be connected to each of the dynamic shift register and to each of the delay circuits so as to deliver the digital signals from one of the dynamic shift registers which has completed its storage operation to the delay circuit associated with each of the dynamic shift registers until all of the dynamic shift registers complete their storage operation, and to combine the digital signals from all of the dynamic shift registers into one frame.

In this case again, the output from the second gate circuit may be processed by processing means.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings forming a part of the specification wherein.

DESCRIPTION OF THE PREFERRED EMBODIMENTS

Figure 1:
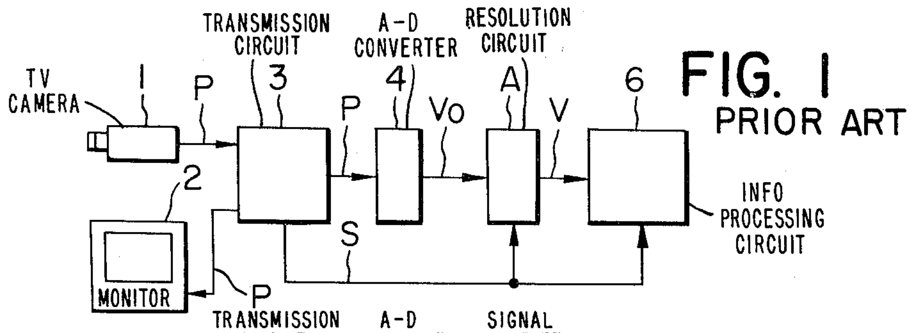
FIG. 1 is a block diagram of an image analyzer according to the prior art.

Referring to FIG. 1, there is diagrammatically shown an image analyzer according to the prior art. According to this system, a television camera 1 provides an analog picture signal P representing an object to be analyzed.

A monitor 2 is provided to monitor the analog picture signal P from the television camera 1, and a transmission circuit 3 of the progressive scanning type transmits the analog picture signal P from the television camera 1 to the monitor 2. These units 1, 2 and 3 together constitute a progressive scanning type television system. The television circuit 3 also transmits the analog picture signal P to an A-D converter circuit 4, which will further be described, and at the same time, supplies a synchronizing signal S to a circuit A for resolving a digital video signal $V_O$ into multiple picture elements and to an information processing circuit 6, as will also be described further. The A-D converter circuit 4 compares the voltage corresponding to the analog picture signal P with a reference voltage and converts the analog picture signal P into a two-digit signal $V_O$ (1 and 0). The circuit A converts the digital video signal $V_O$ into signals V representing the multiple picture elements derived from resolution. The units 1 to 6 constitute an image analyzer using a well-known progressive scanning type television system.

With the described arrangement, the object to be analyzed is photographed by the television camera 1 to provide an analog picture signal P, which is passed through the transmission circuit 3 to the A-D converter circuit 4, where the signal P is converted into a digital video signal $V_O$, which in turn is converted into signals V representing multiple picture elements. Among these digital signals V representing the multiple picture elements derived from resolution, those signals for two adjacent horizontal scanning lines are compared with each other by the information processing circuit 6 to provide an image analysis.

Figure 2:
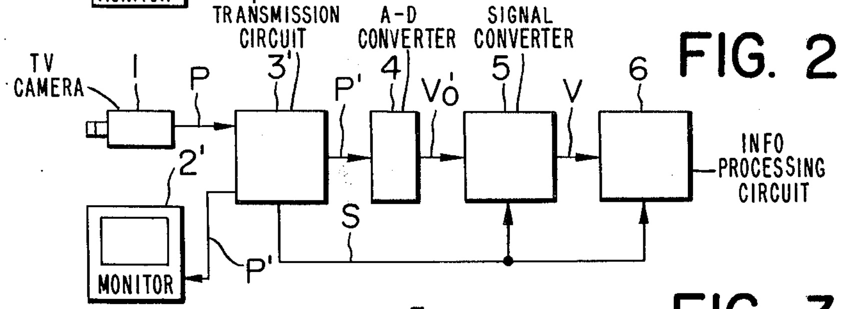
FIG. 2 is a block diagram of the image analyzer according to the present invention.
Figure 3:
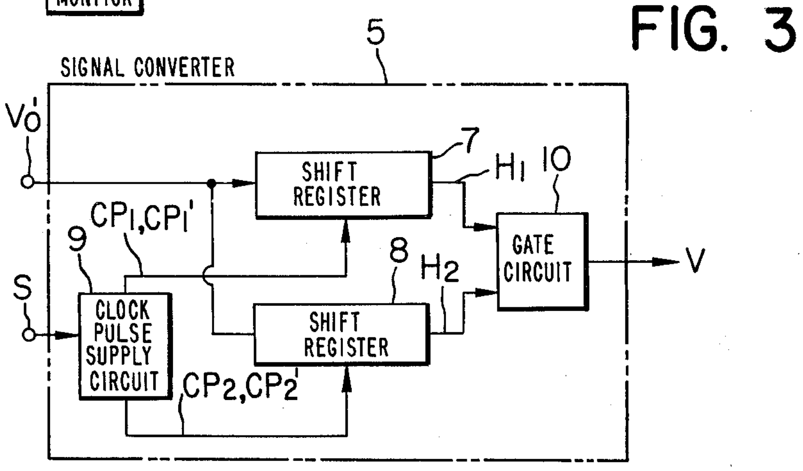
FIG. 3 is a partial block diagram illustrating the essential portion of the analyzer according to an embodiment of the present invention.

FIGS. 2 to 4 illustrate an embodiment of the present invention. As shown, television camera 1 provides an analog picture signal P′, which is monitored by a monitor 2′, and a transmission circuit 3′ of the standard scanning type transmits the analog picture signal P′ to the monitor 2′. The units 1, 2′ and 3′ together constitute a standard scanning type television system. The transmission circuit 3′ also transmits the analog picture signal P′ to an A–D converter circuit 4 which will further be described, and at the same time, supplies various necessary synchronizing signals S to a signal converter circuit 5 and to an information processing circuit 6. The A–D converter circuit 4, similar to that described with respect to FIG. 1, compares the analog picture signal P′ with a reference voltage and thereby converts such analog picture signal P′ into a binary signal $V_O$ (1 and 0). A signal converter circuit 5 resolves the binary signal $V_O'$ into multiple picture elements and converts them into signals equivalent to those signals V which are provided for the multiple picture elements by the use of the progressive scanning type television. The signal converter circuit 5 is arranged as shown in FIG. 3.

Figures 4A, 4B, 4C:
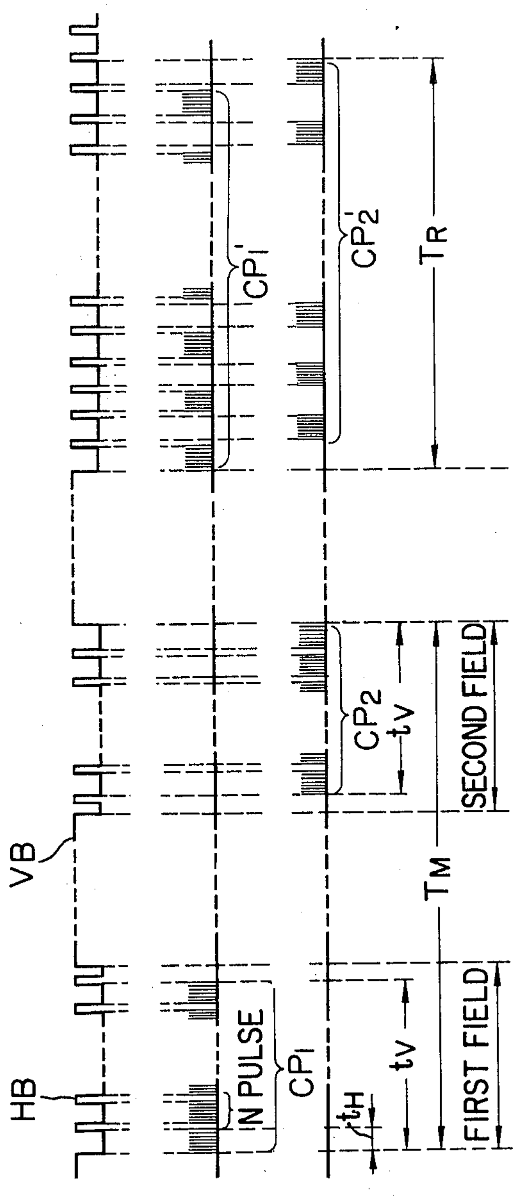
FIGS. 4A, 4B and 4C illustrate the arrangements of signals.

Before describing the construction of the signal converter circuit shown in FIG. 3, reference will be had to FIG. 4A. This figure illustrates horizontal aand vertical blanking signals in a standard scanning type television system, the horizontal blanking signal being designated by HB and the vertical one being designated by VB. During the period between these two different blanking signals, one horizontal scan effective to form a picture image takes place; herein, such horizontal scan takes place M times in a first field, although the last one or two of the horizontal scanning lines in the first field are not shown. In the second field again, the horitzontal scan takes place M times although the first one or two of the horizontal scanning lines are not shown. More specifically, in each field the horizontal scan occurs M times during a period of $t_v$. $T_M$ represents one frame period.

Referring now to FIG. 3 which shows the arrangement of the signal converter circuit 5, there is a clock pulse supply circuit 9 which receives a synchronizing signal S as input and supplies clock pulses CP1 and CP1′ to a shift register 7 and clock pulses CP2 and CP2′ to a shift register 8. The clock pulse CP1 is synchronized with the synchronizing signal S so that N clock pulses CP1 are applied to the shift register 7 during one horizontal scan time $t_H$ for the first field (see FIG. 4B), and resolved into N picture elements per horizontal scanning line and stored in the shift register 7. Since the horizontal scanning occurs M times during the first field period as described, the number of clock pulses CP1 provided during the first field period is N × M and thus, each of M horizontal scanning lines in the first field is resolved into N picture elements and stored in the shift register 7. The clock pulse CP2 is used to store the second field information in the shift register 8. As will be seen in FIG. 4C, after all the first field information has been stored in the shift register 7, the clock pulse CP2 is supplied to the shift register 8 in a manner similar to CP1, that is, N clock pulses CP2 during one horizontal scan time $t_H$, multiplied by M, i.e., N × M are supplied during the second field period. The shift registers 7 and 8 each store signals of M horizontal scanning lines for each field, each horizontal scanning line comprising N picture elements, and thus each of these shift registers has a capacity of N × M bits.

The clock pulses CP1′ and CP2′ are used in order that the information represented by clock pulses CP1 and CP2 stored in each of the shift registers 7 and 8 and corresponding to one frame may be read out during a subsequent frame period. First, N clock pulses CP1′ capable of reading out a signal H1 for one of the horizontal scanning lines which store the first field information are supplied to the shift register 7, and then N clock pulses CP2′ capable of reading out a signal H2 for one of the horizontal scanning lines which store the second field information are supplied to the shift register 8. These are repeated for a period $T_R$, (see FIG. 4), whereby all the information stored in the shift registers are read out.

A gate circuit 10 combines the signals to read out of the shift registers 7 and 8 and transmits the resultant signal to the information processing circuit 6 which will further be described. Thus, the units 7 to 10 constitute a signal converter circuit for converting the digital video signals $V_o'$ provided by the standard scanning system into video signals representing the multiple picture elements as provided by the progressive scanning system. The information processing circuit 6 compares two adjacent horizontal lines of the signals V converted into signals equivalent to those provided by the progressive scanning system, and performs not only the image analysis but also other various processes.

Such construction of the present invention converts the analog picture image P′ provided by the standard scanning system into digital video signals $V_O'$ by means of the A–D converter circuit 4. In the signal converter circuit 5, the digital video signals $V_O'$ are resolved by the clock pulse CP1 which is supplied by circuit 9, which resolves each of M horizontal scanning lines existing during the time $T_v$ in the first field of FIG. 4 into N picture elements, and supplies N × M clock pulses CP1 to the shift register 7 for the digital video signals representative of the first field, and thus the information on the first field is stored in the shift register 7. For the digital video signals representative of the second field, the clock pulse supply circuit 9 also resolves each of M horizontal scanning lines existing during the time $t_v$ in the second field into N picture elements and supplies N × M clock pulses CP2 to the shift register 8, and thus the information on the second field is stored in the shift register 8. In this way, the information on the first field and the information on the second field are separately stored. During the subsequent one-frame period, N clock pulses CP1′ capable of reading out the signal H1 representing a first one of the horizontal scanning lines for the first field are supplied to the shift register 7 to read out the output signal H1. Subsequently, N clock pulses CP2′ capable of reading out the signal H2 representing a first one of the horizontal scanning lines for the second field are supplied to the shift register 8 to read out the output signal H2. These operations are alternatively repeated until output signals H1 and H2 are combined in the gate circuit 10, and the resultant signal may be converted into signals equivalent to the signals V representing multiple picture elements as provided by the progressive scanning system. Then, by causing the information processing circuit 6 to perform an analysis similar to that effected by the use of the progressive scanning system, there is provided an image analyzer using the standard scanning type television.

The present embodiment has been described with respect to an image analyzer using a standard scanning type television system in which one frame consists of two fields. However, the present invention is not limited to the use of the standard scanning system. Thus, an image analyzer using a multi-interlaced scanning type television system may be provided by forming a signal converter circuit having shift registers corresponding in number to the number of fields, one shift register for each field, and by having each field information stored individually and the horizontal scanning lines of respective fields read out alternately one after another, followed by an operation similar to that described above.

Figure 5:
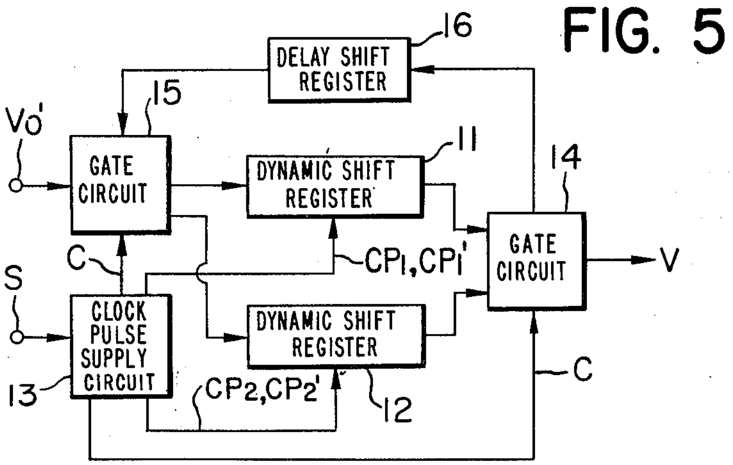
FIG. 5 is a block diagram illustrating another embodiment of the present invention.

FIG. 5 illustrates another embodiment of the present invention. This is similar to FIG. 3 and particularly shows another form of the signal converter circuit 5 in the image analyzer of FIG. 2 using the standard scanning type television system. The difference between FIG. 5 and FIG. 3 is that dynamic shift registers are employed in the embodiment of FIG. 5. The dynamic shifft register 11 stores the information on the first field with the aid of clock pulse CP1 and the dynamic shift register 12 stores the information on the second field with the aid of clock pulse CP2. A clock pulse supply circuit 13 supplies clock pulses CP1 and CP1′ to the dynamic shift register 11 and clock pulses CP2 and CP2′ to the dynamic shift register 12. These clock pulses CP1, CP2, CP1′ and CP2′ are supplied just in the same way as described with respect to the previous embodiment. Also, the clock pulse supply circuit 13 receives a synchronizing signal S as input, as in the previous embodiment. The clock pulse supply circuit 13 also supplies control signal C to gate circuits 14 and 15. The gate circuit 14 is designed such that it is opened at the feedback loop side including a shift register 16 for providing a delay, and closed at the output side from a point at which storage of the first field information has been completed until storage of the second field information has been completed, and that during the readout period it is closed at the feedback loop side and opened at the output side to permit the outputs of the dynamic shift registers 11 and 12 to be combined into a single output. The shift register 16 for providing a delay serves to effect the timing for synchronizing the rewriting of the content of the dynamic shift register 11 with the writing of the second field information for the dynamic shift register 12. The gate circuit 15 is designed such that during the storage of the first field information, it is opened with respect to the dynamic shift register 11 but closed with respect to the other dynamic shift register 12, and that during the storage of the second field information it is opened with respect to the dynamic shift register 12 but opens the input of the dynamic shift register 11 with respect to the output of the delay-providing shift register 16. The ON-OFF switching of these gate circuits 14 and 15 takes place in response to the control signal C.

With such construction, one frame information can be stored, without the two dynamic shift registers 11 and 12 being rendered inoperative, by having the first field information written into the dynamic shift register 11, and then having the content of the dynamic shift register 11 rewritten thereinto through the gate circuit 14, the delay-providing shift register 16 and the gate circuit 15 during the period for writing the second field information into the dynamic shift register 12. Consequently, as in the previous embodiment, the signals provided by the standard scanning system can be converted into signals equivalent to those provided by the progressive scanning system, whereafter the image analysis may take place in the same manner as described in connection with the previous embodiment. In the present embodiment, the dynamic shift register 12 does not form a feedback loop and may be replaced by a static shift register, if desired. Likewise, in the multi-interlaced scanning system, the addition of dynamic shift registers and a delay-providing shift register enables the signals provided by the standard scanning system to be converted into signals equivalent to those provided by the progressive scanning system, so that an image analyzer using a multi-interlaced scanning type television system is provided.

According to the present invention, as described hitherto, the television video signals comprising binary signals (1 and 0) which have been provided by the standard scanning system or the multi-interlaced scanning system through A–D conversion, are stored in the shift registers corresponding to respective fields, and these stored signals are read out alternately and successively, e.g., a first one of the horizontal scanning lines for the first field and then a first one of the horizontal scanning lines for the second field (this is also true with the multi-interlaced scanning system). Thus, in accordance with the present invention, by providing a signal converter circuit for converting the said television video signals into signals equivalent to those provided by the progressive scanning type television, it is possible to use the low-cost and technically perfected standard scanning system (or multi-interlaced scanning system) for the digital image analyzer of the type which compares two adjacent horizontal scanning lines, instead of using the progressive scanning type television system as was done heretofore. Further, the use of shift registers permits frequencies of the clock pulses to be changed and this facilitates the subsequent processes.

We believe that the construction and operation of our novel image analyzer will now be understood and that the several advantages thereof will be fully appreciated by those persons skilled in the art.

We claim:

1. An image analyzer using an interlaced scanning type television system comprising:
- a television circuit for converting an image to be analyzed into analog video signals;
- a converter circuit for converting said analog video signals into digital video signals;
- shift registers for storing and reading out said digital signals for respective fields, said shift registers corresponding in number to the number of said fields;
- a pulse supply circuit for supplying a first clock pulse for imparting a storage operation to said shift registers so that the digital signals for respective fields are successively stored in said shift registers corresponding to said respective fields, and for supplying a second clock pulse for imparting a read-out operation to said shift registers, after completion of said storage operation, so that said digital signals are successively read out of said shift registers in order of the horizontal scanning lines as they form one frame;
- a gate circuit for combining all the read-out outputs of said shift registers into one frame; and
- means for processing the output from said gate circuit.

2. An image analyzer according to claim 1, wherein said television circuit provides a synchronizing signal for synchronizing said supply circuit and said processing means.

3. An image analyzer according to claim 1, wherein said converter circuit compares the voltages representing said analog video signals with a suitable reference voltage and converts the former voltages into digital video signals.

4. An image analyzer using an interlaced scanning type television system comprising:
- a television circuit for converting an image to be analyzed into analog video signals;
- a converter circuit for converting said analog video signals into digital video signals;
- dynamic shift registers for storing and reading out said digital signals for respective fields, said dynamic shift registers corresponding in number to the number of said fields;

- a delay circuit associated with each of said dynamic shift registers other than that for the last field in one frame so that the content of each said dynamic shift register is re-stored upon storage operation of the dynamic shift register corresponding to the subsequent field;
- a pulse circuit for supplying a first clock pulse for imparting a storage operation to said dynamic shift registers so that the digital signals for respective fields are stored in said dynamic shift registers corresponding to said respective fields, and for supplying a second clock pulse for imparting a read-out operation to said dynamic shift registers, after completion of said storage operation, so that said digisignals are successively read out of said dynamic shift registers in order of the horizontal scanning lines as they form one frame;
- a first gate circuit connected to said converter circuit, to each of said dynamic shift registers and to each of said delay circuits so as to distribute said digital video signals for respective fields and to deliver said distributed digital video signals to said dynamic shift registers corresponding to said fields and, when one of said dynamic shift registers is in storage operation, to re-deliver the digital video signals of the other dynamic shift register which has completed its storage operation to said other dynamic shift register for storage therein;
- a second gate circuit connected to each of said dynamic shift register and to each of said delay circuits so as to deliver the digital signals from one of said dynamic shift registers which has completed its storage operation to said delay circuit associated with each of said dynamic shift registers until all of said dynamic shift registers complete their storage operation, and to combine the digital signals from all of said dynamic shift registers into one frame; and
- means for processing the output from said second gate circuit.

5. An image analyzer according to claim 4, wherein said television circuit provides a synchronizing signal for synchronizing said pulse circuit and said processing means.

6. An image analyzer according to claim 4, wherein said pulse circuit provides a synchronizing signal to said first gate circuit so as to enable it to deliver new digital video signals to a first register for a new frame when the storage operation for the last field has been completed, and to said second gate circuit so as to combine the input signals thereto into one frame when the storage operation for the last field has been completed.

* * * * *